(12) United States Patent
Wittliff et al.

(10) Patent No.: US 8,183,993 B2
(45) Date of Patent: May 22, 2012

(54) TIRE PRESSURE MONITOR SYSTEM TOOL WITH PARTS NUMBER DATABASE

(75) Inventors: Bill Wittliff, Gobles, MI (US); Fred Kalel, Grosse Pointe Woods, MI (US); Ray de Schepper, Norwalk (NL)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 13/022,371

(22) Filed: Feb. 7, 2011

(65) Prior Publication Data

US 2011/0161049 A1 Jun. 30, 2011

Related U.S. Application Data

(63) Continuation of application No. 12/108,133, filed on Apr. 23, 2008, now Pat. No. 7,884,707.

(51) Int. Cl.
*B60C 23/00* (2006.01)
*B60C 23/02* (2006.01)
(52) U.S. Cl. .................. 340/442; 340/426.33; 73/146.2; 116/34 R
(58) Field of Classification Search .................. 340/442, 340/443–448, 426.33, 438; 73/146, 146.2; 116/34 R, 34 A
See application file for complete search history.

(56) References Cited

U.S. PATENT DOCUMENTS

| | | | |
|---|---|---|---|
| 5,124,410 A | 6/1992 | Campbell | |
| 5,462,374 A | 10/1995 | Kohno | |
| 5,557,268 A | 9/1996 | Hughes et al. | |
| 5,562,782 A | 10/1996 | Takahashi | |
| 5,562,787 A | 10/1996 | Koch et al. | |
| 5,573,611 A | 11/1996 | Koch et al. | |
| 5,600,301 A | 2/1997 | Robinson, III | |
| 5,602,301 A | 2/1997 | Field | |
| 5,602,524 A | 2/1997 | Mock et al. | |
| 5,731,516 A | 3/1998 | Handfield et al. | |
| 5,952,935 A | 9/1999 | Mejia et al. | |
| 6,172,609 B1 | 1/2001 | Lu et al. | |

(Continued)

FOREIGN PATENT DOCUMENTS

EP 1026015 A2 8/2000

(Continued)

OTHER PUBLICATIONS

Multi-Standard Reader Product Range—Overview; id Systems, Ltd., undated document, Feb. 16, 2011.

(Continued)

*Primary Examiner* — John A Tweel, Jr.
(74) *Attorney, Agent, or Firm* — Baker & Hostetler LLP (57) ABSTRACT

A tool for use with a tire pressure monitor system includes a storing module configured to store a plurality of communication protocols used by the tire pressure monitor system to interface with a vehicle electronic control unit, the storing module further including a database having parts numbers of sensors utilized with the tire pressure monitor system, the database further includes a vehicle data associated with the tire pressure monitor system, a requesting module configured to request the vehicle data from the storing module, a receiving module configured to receive the vehicle data from the storing module, an accessing module configured to access the storing module to retrieve at least one communication protocol based on the vehicle data, a communications module to receive and transmit the at least one communication protocol to and from the electronic control unit and to and from a sensor, and a processor.

25 Claims, 5 Drawing Sheets

U.S. PATENT DOCUMENTS

| | | |
|---|---|---|
| 6,243,007 B1 | 6/2001 | McLaughlin et al. |
| 6,340,929 B1 | 1/2002 | Katou et al. |
| 6,414,592 B1 | 7/2002 | Dixit et al. |
| 6,438,467 B1 | 8/2002 | Pacsai |
| 6,441,727 B1 | 8/2002 | LeMense |
| 6,507,276 B1 | 1/2003 | Young et al. |
| 6,535,116 B1 | 3/2003 | Zhou |
| 6,580,364 B1 | 6/2003 | Munch et al. |
| 6,617,962 B1 | 9/2003 | Horwitz et al. |
| 6,630,885 B2 | 10/2003 | Hardman et al. |
| 6,662,642 B2 | 12/2003 | Breed et al. |
| 6,864,785 B2 | 3/2005 | Marguet et al. |
| 6,904,796 B2 | 6/2005 | Pacsai et al. |
| 6,945,087 B2 | 9/2005 | Porter et al. |
| 6,989,741 B2 | 1/2006 | Kenny et al. |
| 7,053,761 B2 | 5/2006 | Schofield et al. |
| 7,075,421 B1 | 7/2006 | Tuttle |
| 7,104,438 B2 | 9/2006 | Benedict |
| 7,161,476 B2 | 1/2007 | Hardman et al. |
| 7,171,345 B2 | 1/2007 | Mocek |
| 7,319,848 B2 | 1/2008 | Obradovich et al. |
| 7,592,903 B2 | 9/2009 | Kochie |
| 7,592,904 B2 | 9/2009 | Kochie et al. |
| 7,623,025 B2 | 11/2009 | Miller |
| 7,639,122 B2 | 12/2009 | Kochie et al. |
| 7,648,062 B2 | 1/2010 | Corniot |
| 7,884,707 B2 * | 2/2011 | Wittliff et al. ............... 340/442 |
| 2002/0130771 A1 | 9/2002 | Osborne et al. |
| 2003/0080862 A1 | 5/2003 | Kranz |
| 2003/0121320 A1 | 7/2003 | Okubo |
| 2004/0036595 A1 | 2/2004 | Kenny et al. |
| 2004/0036601 A1 | 2/2004 | Obradovich |
| 2005/0154497 A1 | 7/2005 | Strege et al. |
| 2006/0208864 A1 | 9/2006 | Nantz et al. |
| 2008/0100430 A1 | 5/2008 | Kochie et al. |
| 2008/0143506 A1 | 6/2008 | Kochie et al. |

FOREIGN PATENT DOCUMENTS

| | | |
|---|---|---|
| EP | 1092568 A2 | 4/2001 |
| GB | 2305074 A | 3/1997 |
| GB | 2308947 A | 7/1997 |

OTHER PUBLICATIONS

Bartec Auto ID Limited—Activation Tool BXR2000A1; Bartec Auto ID Activation Tool; Sep. 3, 2001.

Bartec Auto ID Limited—BXR LHF—2000 User Manual; Bartec Auto ID—BXR LHF 2000—Range of Rugged Hand Held TPMS Readers; Aug. 2002.

Market demands RF/ID standardization; id Systems Ltd.; undated document, Feb. 16, 2011.

* cited by examiner

TIRE PRESSURE MONITOR SYSTEM TOOL WITH PARTS NUMBER DATABASE

CROSS-REFERENCE TO RELATED APPLICATIONS

This Continuation application claims priority to US patent application entitled "TIRE PRESSURE MONITOR SYSTEM TOOL WITH PARTS NUMBER DATABASE," filed Apr. 23, 2008, having Ser. No. 12/108,133, now U.S. Pat. No. 7,884,707, issued Feb. 8, 2011, the disclosure of which is hereby incorporated by reference in its entirety.

FIELD OF THE INVENTION

The invention relates generally to tire pressure monitoring systems. More particularly, the invention relates to a handheld tire pressure monitoring system tool having a parts number database.

BACKGROUND OF THE INVENTION

Systems have been developed to monitor, for example, vehicle tire pressure, and to report the tire pressure to a receiver at a central monitoring station using radio transmissions. A typical remote automotive tire monitoring system includes a plurality of tire-based sensory transponders and a central, vehicle-based arrangement. The sensory transponders include a component that senses a tire condition, such as tire inflation pressure or tire temperature. Each transponder is capable of outputting a coded transmission that conveys sensed tire condition information and an identifier for reception by the vehicle-based arrangement. Within the vehicle-based arrangement, an electronic control unit ("ECU") processes the conveyed information and controls provision of information regarding the sensed tire conditions to a vehicle operator. During operation of such a system, the vehicle operator is readily notified of a current tire condition, such as a low inflation pressure in a tire.

For a vehicle operator to determine which tire has a condition of interest (e.g., a low inflation pressure), information provided to the vehicle operator must unambiguously identify the location (e.g., right front) of the tire that has the condition of interest. In order for the ECU to provide such tire location information, the ECU has a memory that stores tire identification information for comparison with the identification conveyed from the transponder. Also, within the memory, a certain tire location is associated with each stored tire's identification. Thus, once a provided identification is matched to a stored identification, a location on the vehicle is associated with the provided tire condition information. Accordingly, the operator is made aware that the tire at a certain location (e.g., right front) has the certain condition (e.g., low inflation pressure).

In order to start testing a tire sensor on a vehicle, the tool needs to know the tire pressure monitoring system used in the vehicle. This information is then used by the tool to communicate in the proper communication protocols of the vehicle.

SUMMARY OF THE INVENTION

The foregoing needs are met, to a great extent, by the present invention, wherein one aspect a tire pressure monitor tool is provided having tire sensor parts numbers database. This allows the user to enter the parts number of the sensor in order to get the vehicle data.

In accordance with one embodiment of the present invention, a tool for use with a tire pressure monitor system includes a storing module configured to store a plurality of communication protocols used by the tire pressure monitor system to interface with a vehicle electronic control unit, the storing module further including a database having parts numbers of sensors utilized with the tire pressure monitor system, the database further includes a vehicle data associated with the tire pressure monitor system, a requesting module configured to request the vehicle data from the storing module, a receiving module configured to receive the vehicle data from the storing module, an accessing module configured to access the storing module to retrieve at least one communication protocol based on the vehicle data, a communications module to receive and transmit the at least one communication protocol to and from the electronic control unit and to and from a sensor, and a processor in communication with the storing module, the requesting module, the receiving module, the accessing module, and the communications module, the processor configured to operate the various modules of the tool.

In another embodiment of the present invention, a tool for use with a tire pressure monitor system of a vehicle includes means for storing a plurality of communication protocols used by the tire pressure monitor system to interface with a vehicle electronic control unit, the means for storing further including a database having parts numbers of sensors utilized with the tire pressure monitor system, the database further includes a vehicle data associated with the tire pressure monitor system, means for requesting the vehicle data from the means for storing, means for accessing the means for storing to retrieve at least one communication protocol based on the vehicle data, means for communicating the communication protocol to and from the electronic control unit and to and from a sensor, and means for processing in communication with the means for storing, the means for requesting, the means for accessing, and the means for communicating, the means for processing configured to operate the tool and its functionality.

In yet another embodiment of the present invention, a method of using a tool with a tire pressure monitor system includes storing in a memory a plurality of communication protocols used by the tire pressure monitor system to interface with a vehicle electronic control unit, and a database having parts numbers of sensors utilized with the tire pressure monitor system, wherein the database further includes a vehicle data associated with the tire pressure monitor system, requesting vehicle data from the memory, receiving vehicle data from the memory, accessing the memory to retrieve at least one communication protocol based on the vehicle data, and communicating with electronic control unit utilized by the tire pressure monitoring system with the communication protocol.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

A tire pressure monitor tool is provided that includes a database of parts number for available tire sensors on various vehicles and tires. This allows the user to be able to, in one embodiment, directly enter the parts number of a sensor under test into the tool in order to conduct the desired tests.

Figure 1:
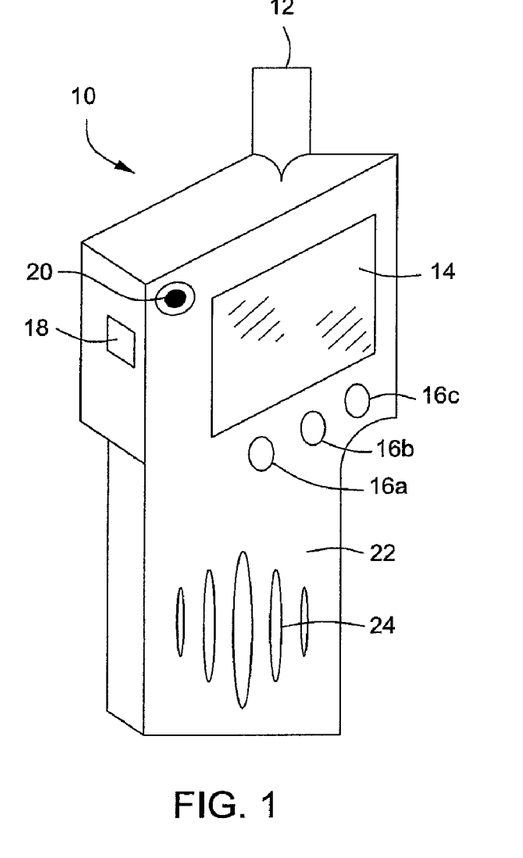
FIG. 1 is a front perspective view of a tire pressure mounting tool according to one embodiment of the invention.

FIG. 1 illustrates a tire pressure monitor tool 10 according to one embodiment of the invention. The tool 10 includes an antenna 12, display 14, selector button 16a-16c, port 18, a power button 20, a casing 22, and passages 24. The antenna 12 may be used to transmit signals from the tool 10 to an electronic control unit of a vehicle and a tire pressure sensor mounted, for example, on a rim or tire of the vehicle. The display 14 may be used to display information to a user regarding, for example, a tire pressure monitor system of a vehicle or status information regarding the sensor or diagnostic function of the tool 10.

The selector buttons 16a-16c may be used to navigate through the menus presented on the display 14 and select certain functions to be performed. The selector buttons 16a-16c may be positioned below select menus presented on the display 14. The selection displays may be, for example, up and down arrows, an enter function, a menu function, start, activate, and next operations, yes, no, okay, redo, and stop functions, and reuse or new functions.

In one embodiment, the selector buttons 16a-16c may be used to select numbers and/or letters representing the parts number of the sensor under test. Additionally, the selector buttons can be replaced with or used in conjunction with a keyboard having alphanumeric keys. Additionally, display 14 can be a touch screen allowing user input of the sensor's parts number. A menu can also be displayed so that the user can use menu driven screens to input the sensor's parts number. In order to test the tire sensor, the user can enter information about the year, make and model of the vehicle under test. However, the sensor under test may not be located as the sensor could have been replaced by non-OEM (original equipment manufactures) tire sensors. Thus, by having a database of available tire sensor information based on parts numbers, regardless of make, model or year of the vehicle under test, the user can enter directly the sensor under test's parts number in order for that tool to test it.

The port 18 may be a port that enables the tool 10 to be connected to, for example, a computer or Internet connection that enables the tool to be updated with modified or additional information. The port 18 may be, for example, an RS232 serial port that connects the tool 10 to the computer or Internet connection using an RS232 serial cable. This is described in further detail below. In other embodiments, the port 18 can be a USB, FIREWIRE, Ethernet or a wireless connection.

The power button 20 may be used to turn the tool 10 on and off. According to one embodiment of the invention, the tool may turn off automatically after, for example, three to four minutes of inactivity.

The casing 22 provides a housing for the tool 10. The casing may be provided with the passages 24 that may be located in front of a speaker (not shown) that emits audible tones or other notifications while the tool 10 is being used.

Figure 2:
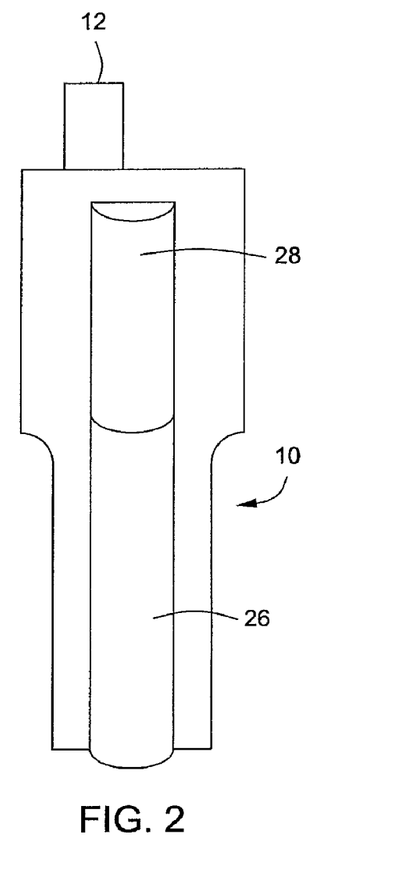
FIG. 2 is a rear view of a tire pressure monitor tool according to one embodiment of the invention.

FIG. 2 illustrates a rear view of the tool 10 according to one embodiment of the invention. The tool 10 may be battery powered. Therefore, the tool 10 may be provided with a battery compartment 26. The battery compartment 26 may include a removable battery cover 28 that allows removable insertion of batteries within the battery compartment 26. According to one embodiment of the invention, the tool 10 is powered by three (3) size C batteries, however, other battery sizes can also be used.

Figure 3:
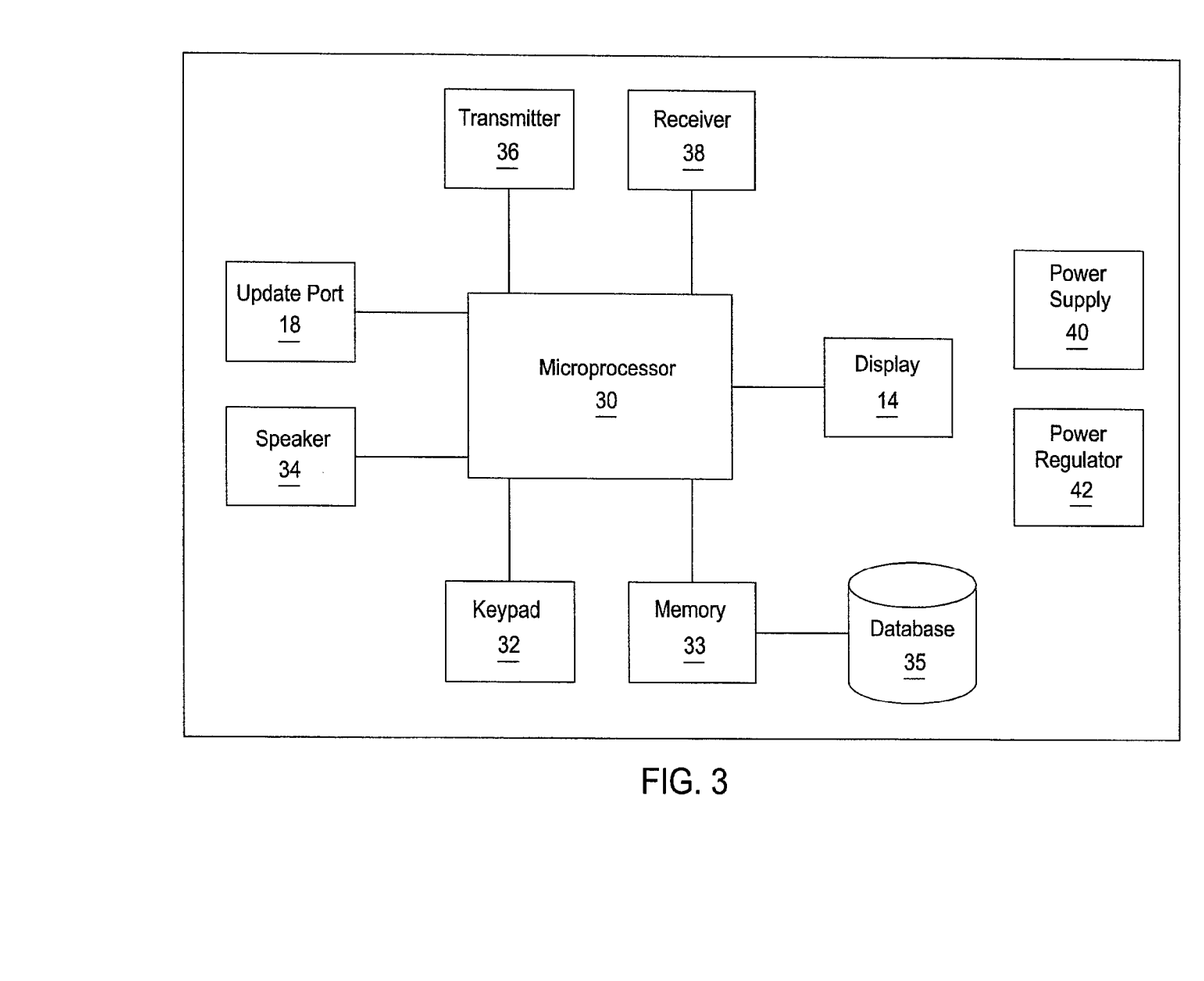
FIG. 3 is a block diagram of a tire pressure monitor tool according to one embodiment of the invention.

FIG. 3 illustrates a block diagram of the components of the tool 10 illustrated in FIGS. 1 and 2. The tool 10 may include a microprocessor 30 that processes software used to operate the tool 10. According to one embodiment of the invention, the microprocessor is an ATMEGA2561 microprocessor having a clock speed of 8 MHz. The microprocessor 30 communicates with a keypad 32. According to one embodiment of the invention, the keypad 32 includes the selector buttons 16a-16c illustrated in FIG. 1 or can be alphanumeric keys. The microprocessor 30 may also be in communication with a speaker 34. The speaker 34 may be used to provide audible tones or notifications during use of the tool 10.

The microprocessor 30 is in communication with a memory 33. The memory may be in addition to other memories accessed by the processor in order for it to operate the tool 10 properly, Memory 33 may store database 35 that contains the parts number of the various available tires sensors from various manufacturers. The database may be partitioned or arranged so that the parts number may be easily located. Once the parts number is entered, then the tool can conduct the sensor test under the proper conditions because the test parameters are known based on the parts number of the sensor under test. Even if the vehicle is not in the tool's database, by having a parts number database, any tire sensor on the vehicle can be tested. This provides an alternative to the user entering the vehicle's year, make and model as previously done. The tire sensor parts number may be associated or disassociated with a vehicle under test or with a particular tire pressure monitoring system. For example, Toyotas may have only one type of sensor and by entering the parts number of the sensor under test, the vehicle information can be presented to the user.

In another embodiment, the vehicle's tires sensor OEM information can be cross referenced or double checked to make sure that the information in the OEM database is correct and that the correct testing parameters (frequency, etc.) are being used. For example, after entering the vehicle's year, make and model number, the tool will start its testing. However, if the vehicle's OEM database is incorrect in the type tire sensor tire monitoring system on the vehicle, thereby causing a working tire sensor not to activate due to incorrect testing parameters on communication protocols, the user will believe that the tire sensor has malfunctioned and replace the working tire sensor. Before replacing the "malfunctioned" tire sensor, the user can enter the correct parts number of the sensor and attempt to activate the sensor again to determine if the sensor is in fact has "malfunctioned." This double check system decreases the cost of repairs and ensures that only truly "malfunctioned" tire sensors are being replaced instead of the false positive failed tire sensors.

The microprocessor 30 may also be in communication with a transmitter 36 and a receiver 38. The transmitter 36 may be used to transmit signals to a tire pressure sensor mounted on a wheel of a vehicle or an electronic control unit of a vehicle. According to one embodiment of the invention, the transmitter 36 operates at 125 kHz. Although only one transmitter is shown, it is to be understood that multiple transmitters operating at different frequencies including transmitters of different types may be used.

The receiver 38 may be used to receive signals transmitted from a tire pressure sensor mounted on a wheel vehicle and an electronic control unit of a vehicle. According to one embodiment of the invention the receiver 38 may operate at 315 MHz and have a clock speed of 10.178 MHz. Alternatively, the receiver 38 may operate at 433 MHz and have a clock speed of 13.225 MHz. Although only one receiver is shown, it is to be understood that multiple receivers operating at different frequencies and having different clock speeds may be used. In other embodiments, a combination transceiver may be used instead of separate receivers and transmitters.

The tool 10 may also include a power supply 40 (internal and/or external). As stated above, the power supply may be, for example, three (3) size C batteries. The power supply 40 may be in communication with a power regulator 42. The power regulator 42 may be used to regulate the power supplied to each device of the tool 10.

Figure 4:
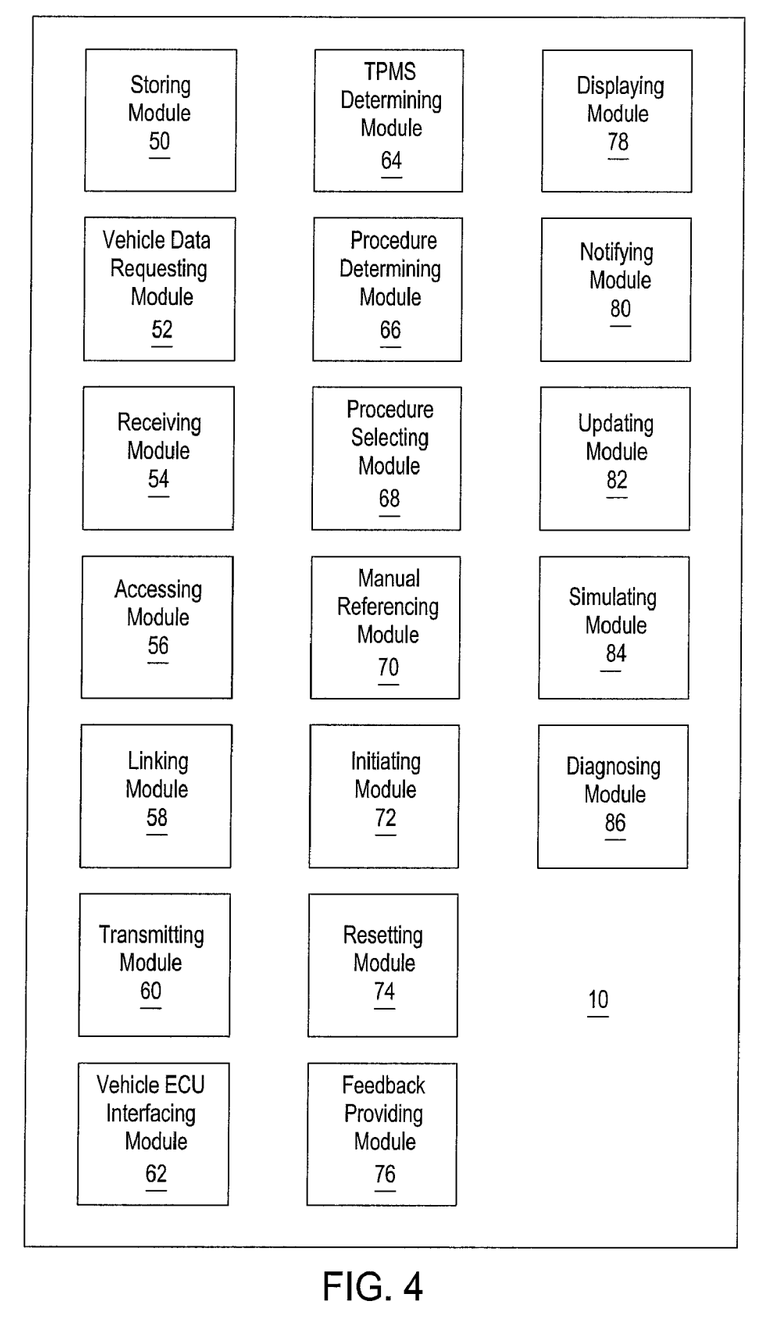
FIG. 4 is a block diagram of a tire pressure monitor tool according to another embodiment of the invention.

FIG. 4 illustrates a block diagram of the tire pressure monitor tool 10 shown in FIGS. 1 and 2 according to another embodiment of the invention. The tool 10 may include a storing module 50 (in place of or in addition to memory 33) that stores information regarding a plurality of tire pressure monitor systems. According to one embodiment of the invention, the information stored relates to a plurality of tire pressure monitor systems from a variety of vehicle manufactures and various models and years of the vehicles. The information can also include a database containing the parts number for the various tire sensors associated or disassociated from the vehicle's year, make and model. The storing module 50 may be, for example, any suitable storage medium such as a storage module on a microprocessor, memory 33, a hard disk, a removable storage media such as a flash disk or other suitable storage mechanism.

The tool 10 also includes a vehicle data requesting module 52. The vehicle data requesting module 52 may be used to request data regarding a particular vehicle for which the tool 10 may be used. The vehicle data requesting module 52 may present a user of the tool 10 with a plurality of screens displaying information regarding various vehicle types. For example, the user may be presented with the vehicle data associated with the vehicle for which the tool 10 was most recently used. According to another embodiment, the user may be presented with a series of screens displaying lists of various makes, models, and years of various vehicles or with various sensor parts numbers. The user may use the selector buttons to navigate the lists and select the make, model, and year of a desired vehicle or the sensor's parts number. A receiving module 54 may be used to receive input provided by the user.

An accessing module 56 may be used to access the information stored in the storing module 50 to determine whether any of the information stored by the storing module 50 is associated with the vehicle data input by the user or by the sensor's parts number. If the storing module 50 does not include any information associated with the vehicle data or the sensor's parts number, the user may be notified that no information was located. If information associated with the vehicle data or the sensor's parts number is located, however, a linking module 58 may be used to link the information with the vehicle data or the sensor's parts number. The information may include, for example, communication protocols for communicating with an electronic control unit of the vehicle, procedures for resetting a tire pressure monitor system of the vehicle, diagnosing the tire pressure monitor system of the vehicle or other functions.

A transmitting module 60 may then be used to transmit a signal from the tool 10 to a tire pressure sensor of the vehicle or an electronic control unit of the vehicle. If the signal is transmitted to the electronic control unit of the vehicle, a vehicle electronic control unit interfacing module 62 may be used to interface with the vehicle electronic control unit. The tool 10 may interface with the vehicle electronic control unit to, for example, reset a tire pressure monitor system of the vehicle. As discussed above, tire replacement and rotation require resetting of the vehicle's tire pressure monitor system. This enables the vehicle electronic control unit to maintain locations of each tire pressure sensor such that accurate information may be displayed to a driver of the vehicle using, for example, a dashboard display of the vehicle's tires.

A tire pressure monitor system determining module 64 may be used to determine a type of tire pressure monitor system provided on the vehicle. This information may be obtained, for example, from the vehicle electronic control unit or by matching the vehicle data with vehicle data provided in a lookup table stored by the tool. The vehicle data may be associated with the particular type of tire pressure monitor system installed on the vehicle. In another embodiment, the type of tire pressure monitoring system may be determined by the user entering the sensor under test's part number. Upon determining the tire pressure monitor system installed on the vehicle, a procedure determining module 66 may determine a procedure to be followed to, for example, reset or diagnose the tire pressure monitor system of the vehicle. Based on instructions inputted by a user, a procedure selecting module 68 selects the procedure corresponding to the instructions input by the user. Some procedures may require a user to perform procedures specific to a vehicle or a sensor. These procedures are typically located in an owner's manual of the vehicle or the manual of the sensor under test. Therefore, a manual referencing module 70 may be used to refer to the owner's manual of the vehicle or sensor so that the user may perform this procedure prior to continuing to use the tool 10.

According to one embodiment of the invention, an initiating module 72 may be used to initiate one or more tire pressure sensors of a vehicle. Initiating the tire pressure sensors places the sensors in a state that enables the sensors to communicate with the tool 10 and the electronic control unit of the vehicle. After initiating the sensors, the tire pressure monitor system of the vehicle may be, for example, reset using resetting module 74. The resetting module 74 enables the electronic control unit of the vehicle to determine locations, identification numbers, and other information regarding the tire pressure sensors mounted on one or more wheels of the vehicle. According to one embodiment of the invention, the antenna 12 of the tool 10 is placed adjacent a valve stem of a wheel of a vehicle. The tool 10 receives, for example, location, identification number, pressure information, and possibly other information from the tire pressure sensor using receiving module 54 and transmits the information to the vehicle electronic control unit using transmitting module 60.

A feedback providing module 76 may be used to determine whether the tire pressure monitor system has been reset. For example, the feedback providing module 76 may cause symbols, text or other information to be displayed on the display 14 indicating that a reset procedure has been completed. The information may be displayed on the display 14 using displaying module 78. A notifying module 80 may be used to notify the user that a reset or other procedure has been completed. For example, the notifying module 80 may cause an electronic control unit of a vehicle to sound a horn of the vehicle or flash one or more lights of a vehicle indicating that the reset or other procedure has been completed.

An updating module 82 may be used to update the information stored by the storing module 50 or memory 33. The updating module 82 may be in communication with the port 18. The updating module 82 may receive information from a computer, the Internet or other data source using, for example, an RS232 serial cable connected to the port 18 and the computer or other device. The updating module 82 may modify information stored by the storing module 50 or memory 33 or add information to the storing module 50 or memory 33. Additional information may be, for example, information relating to tire pressure monitor systems installed on newer vehicles.

The tool 10 may also include a simulating module 84. The simulating module 84 may be used to simulate a tire pressure sensor to validate the functionality of a tire pressure monitor system on a vehicle.

A diagnosing module 86 may also be used to diagnose a tire pressure monitor system on a vehicle. The diagnosing module 86 may be used to obtain, for example, tire pressure and other information from the sensor.

Figure 5:
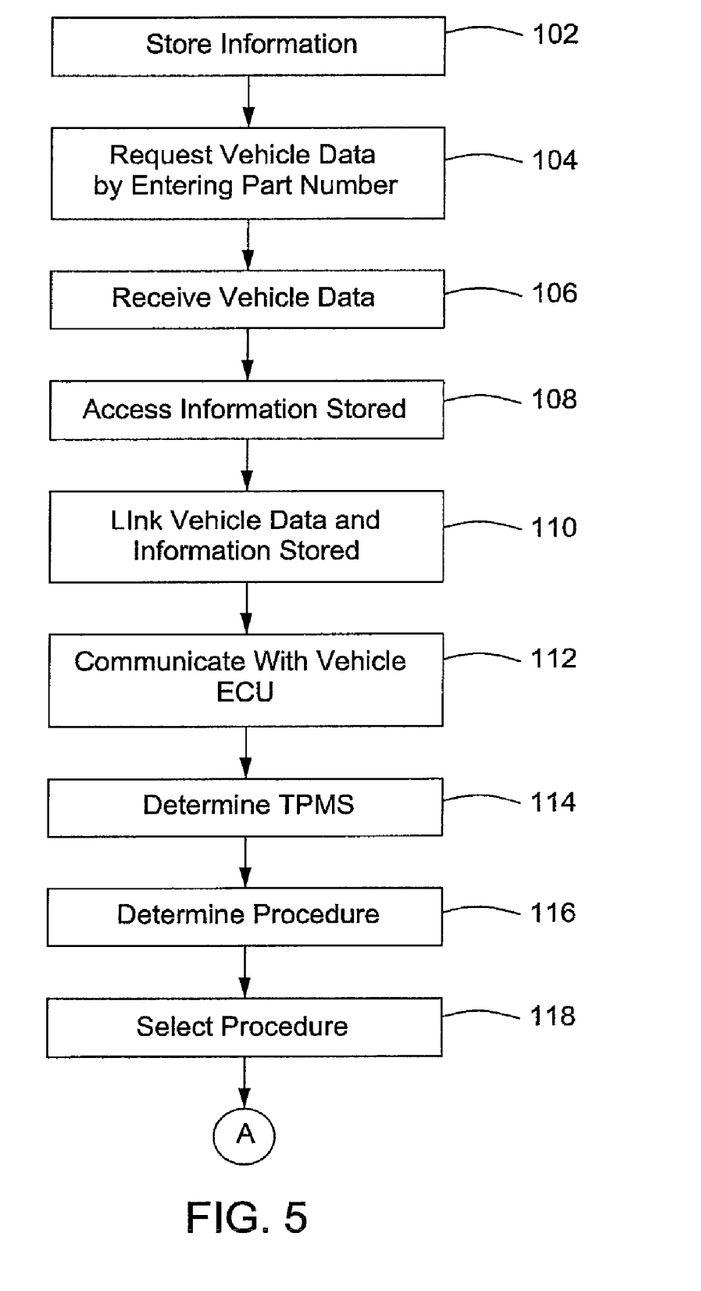
FIGS. 5 and 6 illustrate a method of communicating with a tire pressure monitor system of a vehicle according to one embodiment of the invention.
Figure 6:
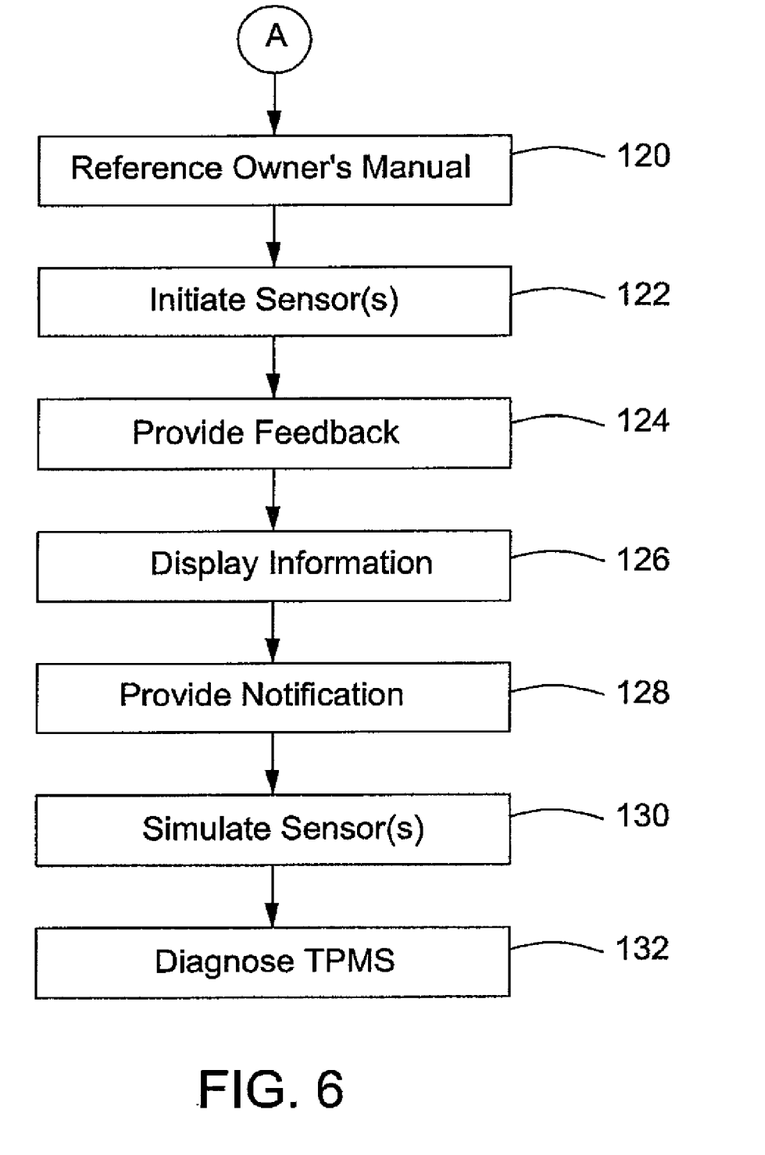

FIGS. 5 and 6 illustrate a method of communicating with a tire pressure monitor system of a vehicle using a tire pressure monitor tool according to one embodiment of the invention. In step 102, information regarding tire pressure monitor systems and vehicles using such systems may be stored by the tire pressure monitor tool. Additionally, the tool may include a tire sensor parts number database that may be associated or disassociated with various vehicles or both. The database may include information about each sensor that is associated with a particular vehicle or the database may include information about each sensor regardless of whether a particular vehicle manufacturer uses that sensor or not. The tool may be used to obtain tire pressure information from one or more wheels of a vehicle provided with tire pressure sensors. To communicate properly with a tire pressure sensor, the tire pressure tool can be provided with data regarding the vehicle from which tire pressure information is sought or the communication protocol (i.e. frequency) used by the sensor under tests. Alternatively or in addition to the tool can be provided with the sensor's parts number to determine which communication protocol (i.e. frequency) to use to communicate with the sensor under test. Vehicle data or sensor data may be requested using the tool as illustrated in step 104. Vehicle data may be requested by, for example, displaying a make, model, and year of a vehicle and requesting that the user confirm or change the vehicle data. Additionally, vehicle data may be retrieved by entering a parts number via an input device.

If the vehicle data displayed is not related to the vehicle from which tire pressure information is sought, the tool may provide a series of displays to the user enabling the user to select a make, model, and year data from among a list of makes, models, and years. This information may be received by the tool in step 106. The information stored in step 102 is then accessed in step 108 to determine whether tire pressure monitor system information relating to the vehicle or sensor data received by the tool is stored. If information relating to the vehicle data or sensor is located, this information is linked with the vehicle data in step 110.

The tool may use this information to communicate with the electronic control unit of the vehicle in step 112. Based on the communication with the electronic control unit, a determination may be made regarding a tire pressure monitor system installed on the vehicle 114. Alternatively, the tire pressure monitor system on the vehicle may be determined by the entering the tire sensor under test's parts number. Based on the tire pressure monitor system installed, a determination may be made regarding a procedure to, for example, reset or diagnose the tire pressure monitor system, step 116. The resetting or diagnosing procedure is then selected based on input provided by a user using the tool 10 as illustrated in step 118. The resetting or diagnosing procedure may require a user to perform a procedure particular to the vehicle or the sensor under test. Therefore, the tool may reference a vehicle or a tire sensor's manual so that the user may follow the procedure identified in the respective manuals in step 120. The procedure may be, for example, placing the vehicle in a learn mode such that the vehicle or electronic control unit is able to receive tire pressure monitor system information from tire pressure sensors provided on one or more wheels of the vehicle.

In step 122, one or more of the tire pressure sensors provided on the wheels of the vehicle may be initiated. Initiating the tire pressure sensors enable the sensors to communicate with the tool 10 and the vehicle electronic control unit. Initiating the sensors may be performed by, for example, placing an antenna of a tire pressure monitor tool adjacent or near a valve stem of a wheel of the vehicle. The tool 10 transmits and receives information between the vehicle electronic control unit and the tire pressure sensor such that the vehicle or the electronic control unit may determine a location, identification number, tire pressure, or other information from the tire pressure sensor.

Feedback may be provided to the user to, for example, indicate that a sensor has been successfully initiated or that the signal has been received by the tire pressure monitor tool in step 124. This information may be displayed on a display of the tire pressure monitor tool as illustrated in step 126. The user may also be notified whether a resetting or diagnosing procedure has been completed in step 128. For example, the tool 10 may cause the electronic control unit of the vehicle to sound a horn of the vehicle or flash one or more lights of the vehicle indicating that the resetting or diagnosing procedure has been completed.

The tool 10 may also simulate a tire pressure sensor of a vehicle in step 130. The tool 10 may simulate the tire pressure sensor to validate the functionality of a tire pressure monitor system installed on a vehicle. The tool 10 may also be used to diagnose the tire pressure monitor system in step 132. The tool 10 may be used to obtain information such as tire pressure and sensor identification information. Additionally, the tool 10 may obtain information regarding a battery condition of the batteries provided in the tire pressure monitor tool 10.

According to one embodiment of the invention, the tool 10 may be updated with modified or additional tire pressure monitor system information or sensors. For example, the tool may be provided with a port that receives, for example, an RS232 serial cable that may be connected to a computer, the Internet or other data source such that tire pressure monitor system information may be communicated to the tool and stored. The tire pressure monitor system information may include modifications or additions to the information already stored by the tire pressure monitor tool.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tool for use with a tire pressure monitor system, comprising:
   a storing module configured to store a plurality of communication protocols used by the tire pressure monitor system to interface with a vehicle electronic control unit, the storing module further including a database having part numbers of sensors utilized with the tire pressure monitor system, the database further includes a vehicle data associated with the tire pressure monitor system;
   a requesting module configured to request the vehicle data from the storing module;
   a receiving module configured to receive the vehicle data from the storing module;
   an accessing module configured to access the storing module to retrieve at least one communication protocol based on the vehicle data;
   a communications module to receive and transmit the at least one communication protocol to and from the electronic control unit and to and from a sensor; and
   a processor in communication with the storing module, the requesting module, the receiving module, the accessing module, and the communications module, the processor configured to operate the various modules of the tool.

2. The tool of claim 1, wherein the communications module further comprises a transmitting module.

3. The tool of claim 1, wherein the part number is based on the sensor used in the tire pressure monitor system of a vehicle.

4. The tool of claim 1, wherein the communications module transmits and receives the at least one communication protocol to and from a display on a dashboard of a vehicle.

5. The tool of claim 1 further comprising a simulating module in communication with the processor and simulates the sensor used in a vehicle.

6. The tool of claim 1 further comprising an update port in communication with the processor and configured to update the various modules in the tool.

7. The tool of claim 1 further comprising a diagnostic module in communication with the processor and configured to diagnose the tire pressure monitor system.

8. The tool of claim 1 further comprising a resetting module in communication with the processor and configured to reset the tire pressure monitor system.

9. The tool of claim 1 further comprising a selecting module configured to select the at least one communication protocol based on the vehicle data.

10. A tool for use with a tire pressure monitor system of a vehicle, comprising:
    means for storing a plurality of communication protocols used by the tire pressure monitor system to interface with a vehicle electronic control unit, the means for storing further including a database having part numbers of sensors utilized with the tire pressure monitor system, the database further includes a vehicle data associated with the tire pressure monitor system;
    means for requesting the vehicle data from the means for storing;
    means for accessing the means for storing to retrieve at least one communication protocol based on the vehicle data;
    means for communicating the at least one communication protocol to and from the electronic control unit and to and from a sensor; and
    means for processing in communication with the means for storing, the means for requesting, the means for accessing, and the means for communicating, the means for processing configured to operate the tool and its functionality.

11. The tool of claim 10, wherein the means for communicating further comprises a transmitting module.

12. The tool of claim 10, wherein the part number is based on the sensor used in the tire pressure monitor system of the vehicle.

13. The tool of claim 10 further comprising means for displaying at least one of vehicle information and tire pressure monitor system information, the means for displaying being in communication with the means for processing.

14. The tool of claim 10 further comprising a simulating module in communication with the means for processing and simulates the sensor used in the vehicle.

15. The tool of claim 10 further comprising a diagnostic module in communication with the means for processing and configured to diagnose the tire pressure monitor system.

16. The tool of claim 10 further comprising means for diagnosing the tire pressure monitor system and being in communication with the means for processing.

17. The tool of claim 10 further comprising means for resetting the tire pressure monitor system and being in communication with the means for processing.

18. The tool of claim 10 further comprising means for selecting the at least one communication protocol based on the vehicle data.

19. A method of using a tool with a tire pressure monitor system, comprising:
    storing in a memory a plurality of communication protocols used by the tire pressure monitor system to interface with a vehicle electronic control unit, and a database having parts numbers of sensors utilized with the tire pressure monitor system, wherein the database further includes a vehicle data associated with the tire pressure monitor system;
    requesting vehicle data from the memory;
    receiving vehicle data from the memory;
    accessing the memory to retrieve at least one communication protocol based on the vehicle data; and
    communicating with electronic control unit utilized by the tire pressure monitoring system with the at least one communication protocol.

20. The method of claim 19 further comprising displaying at least one of vehicle information and tire pressure monitor system information on a display of the tool.

21. The method of claim 19 further comprising displaying at least one of vehicle information and tire pressure monitor system information on a display of a vehicle.

22. The method of claim 19 further comprising diagnosing the sensor by activating the sensor with the tool.

23. The method of claim 19, further comprising communicating with the sensor utilized by the tire pressure monitoring system, wherein if communicating with the sensor is unsuccessful, then comparing the sensor part number with the sensor information in the vehicle database to see if the unsuccessful communication is due to an error in the communication protocol associated with the vehicle data.

24. The method of claim 19 further comprising communicating with the sensor utilized by the tire pressure monitoring system.

25. The method of claim 19 further comprising determining at least one communication protocol based on the vehicle data.

* * * * *